(12) United States Patent
Devpura et al.

(10) Patent No.: US 10,339,040 B2
(45) Date of Patent: Jul. 2, 2019

(54) CORE DATA SERVICES TEST DOUBLE FRAMEWORK AUTOMATION TOOL

(71) Applicant: SAP SE, Walldorf (DE)

(72) Inventors: Ashish Devpura, Bengaluru (IN); Rohan Ghosh, Bengaluru (IN)

(73) Assignee: SAP SE, Walldorf (DE)

( * ) Notice: Subject to any disclaimer, the term of this patent is extended or adjusted under 35 U.S.C. 154(b) by 191 days.

(21) Appl. No.: 15/628,157

(22) Filed: Jun. 20, 2017

(65) Prior Publication Data
US 2018/0365134 A1 Dec. 20, 2018

(51) Int. Cl.
G06F 11/36 (2006.01)
G06F 16/21 (2019.01)
G06F 16/2455 (2019.01)

(52) U.S. Cl.
CPC ...... *G06F 11/3688* (2013.01); *G06F 11/3684* (2013.01); *G06F 11/3692* (2013.01); *G06F 16/212* (2019.01); *G06F 16/2455* (2019.01)

(58) Field of Classification Search
CPC .................................................. G06F 11/3684
USPC ........................................................ 714/38.1
See application file for complete search history.

(56) References Cited

U.S. PATENT DOCUMENTS

| | | | | |
|---|---|---|---|---|
| 9,978,084 | B1* | 5/2018 | Sharma | G06Q 30/0269 |
| 2007/0016880 | A1* | 1/2007 | Brinson | G06F 11/261 |
| | | | | 716/106 |
| 2011/0283260 | A1* | 11/2011 | Bucuvalas | G06F 11/3664 |
| | | | | 717/124 |
| 2012/0324420 | A1* | 12/2012 | Collinson | G05B 17/02 |
| | | | | 717/105 |
| 2017/0017709 | A1* | 1/2017 | Sarferaz | G06F 16/27 |
| 2017/0052882 | A1* | 2/2017 | Sonoda | G06F 11/3684 |
| 2017/0323001 | A1* | 11/2017 | Schwing | G06F 16/284 |
| 2018/0357143 | A1* | 12/2018 | Panambur | G06F 11/3672 |

OTHER PUBLICATIONS

Bandameedapalli, Sunil, "Introduction to CDS Test Double Framework—How to write unit tests for ABAP CDS Entities?" Oct. 19, 2016, Internet: https://blogs.sap.com/2016/10/19/introduction-cds-test-double-framework-write-unit-tests-abap-cds-entities, pp. 1-11.

* cited by examiner

*Primary Examiner* — Chae M Ko
(74) *Attorney, Agent, or Firm* — Jones Day

(57) ABSTRACT

Computer-implemented methods for evaluating integrity of data models with improved efficiency by providing an automation tool for core data services test double framework. A package is selected where a semantic and reusable data model is expressed in data definition language. Subsequently, a class is selected to create local test classes. Local test class templates are generated for the package based on a class name and a package name. Then integrity of the data model is determined by comparing an actual result for the data model and an expected result for the data model. Related apparatus, systems, techniques and articles are also described.

20 Claims, 11 Drawing Sheets

FIG. 7

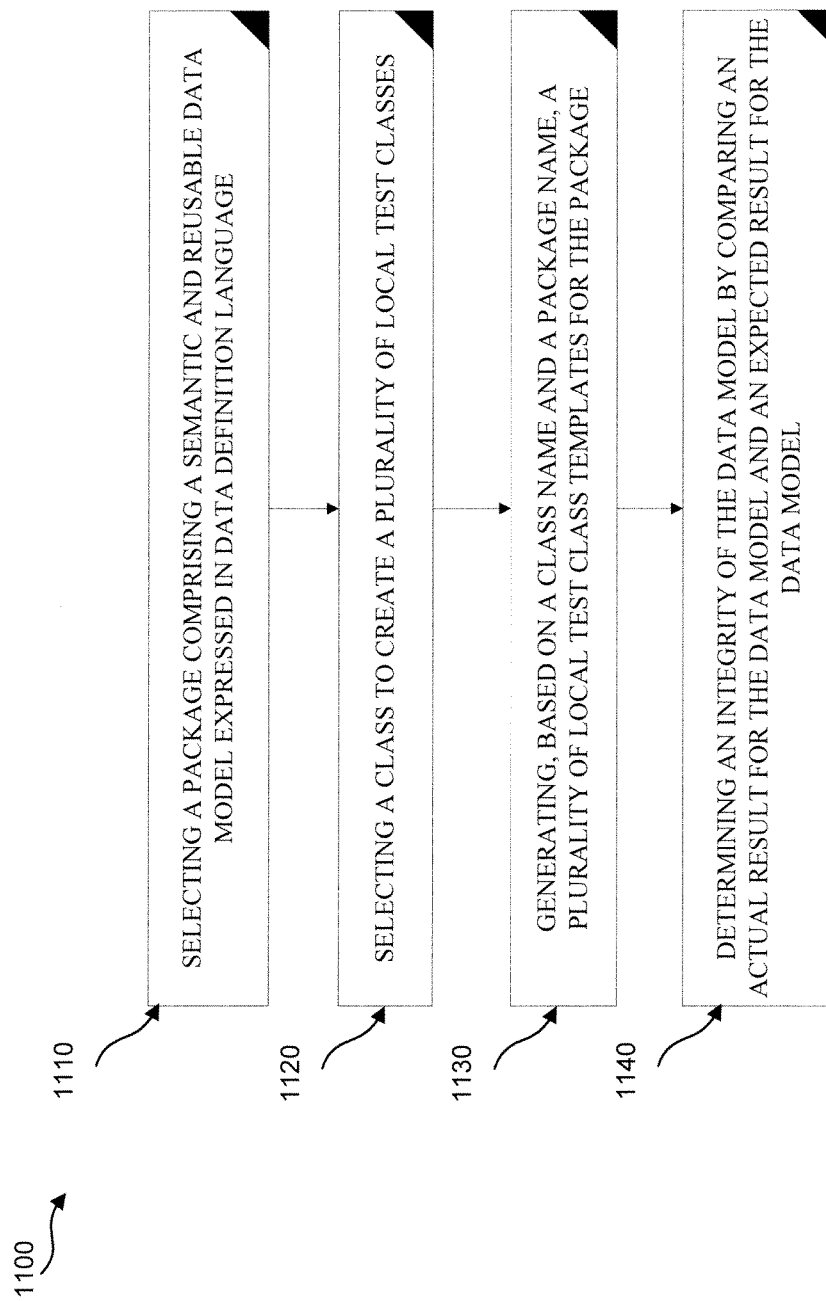

CORE DATA SERVICES TEST DOUBLE FRAMEWORK AUTOMATION TOOL

TECHNICAL FIELD

The subject matter described herein relates to generation of test classes for core data services views, and more specifically to improved efficiency of test class generation by providing an automation tool for core data services test double framework.

BACKGROUND

Core data services (CDS) is a data modeling infrastructure for defining and consuming semantic and reusable data models on the database, regardless of the database used. Package name refers to the package which contains CDS views for which the local test classes need to be created. Class name refers to the class in which the local test classes will be created. Template is program which will have a basic structure of a test class for a particular type of CDS view. CDS Test Double Framework is a framework which tests CDS views through mock databases and mock data.

Underlying/aggregated views/tables are views/tables over which a CDS view is made. A CDS view may belong to one of several types, including simple CDS interface view, CDS view with aggregations, CDS view with calculations, CDS view with data control language (DCL), CDS view with group by and join, CDS view with parameters, CDS view with unions, CDS view with table functions, and CDS view with nulls.

After the creation of the CDS view, a test class has to be maintained for it, which validates the view is working as expected. This is akin to creating a unit test class for a method or function module. Generation of a test class is a manual, repetitive task which can be automated.

SUMMARY

In a first aspect, the integrity of data models can be evaluated by selecting a package comprising a semantic and reusable data model expressed in data definition language. Subsequently, a class may be selected to create a plurality of local test classes. Then local test class templates for the package may be generated based on a class name and a package name. After that, integrity of the data model may be determined by comparing an actual result for the data model and an expected result for the data model. The data model may be a CDS view.

Local test class templates may be generated. An appropriate local test class template may be selected based on a CDS view type. Mock tables and/or views may be created and mock data may be inserted. The selected local test class template may then be replaced with a CDS view-specific data.

The integrity of the data model can be evaluated using a CDS test double framework. The integrity of the data model can be evaluated by executing a SQL select query on the mock data to produce an actual result for the data model. Expected result for the data model may be provided. The actual result and the expected result may then be compared.

Each of the local test class templates may correspond to a different CDS view type. CDS view types may include any one of, or any combination of, the following: an interface view, view with aggregations, a view with calculations, a view with data control language, a view with group by and join, a view with parameters, a view with unions, a view with table functions, and a view with nulls. A mock database can be built and then it can be populated with mock data. Integrity of data models or integrity of CDS views may then be evaluated.

Non-transitory computer program products (i.e., physically embodied computer program products) are also described that store instructions, which when executed by one or more data processors of one or more computing systems, cause at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The subject matter described herein provides many technical advantages. These advantages include increased processing efficiency, reduced time and cost, and improved quality and consistency of generation of test classes. Efficiency is increased because the repetitive portion of the task is done only once for a give core data services view. Time and cost are reduced because using described methods reduces the time of generating test classes from fifteen to twenty minutes per view to two to five minutes per view. This results in 65% to 90% overall time reduction. The cost is reduced in proportion to time reduction because the engineer's time to complete a project is reduced. Quality and consistency of test class generation is improved because a significant portion of the work is automated and does not depend anymore on the skills and talents of individual engineer assigned to the task.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

FIG. 7 is a view illustrating an example of a portion of a class builder code for automated generation of test classes.

FIG. 11 is a flow chart illustrating an example of the current subject matter.

Like reference symbols in the various drawings indicate like elements.

DETAILED DESCRIPTION

Systems and methods described herein relate to generation of test classes for CDS views. More specifically, systems and methods improve efficiency of test class generation by providing an automation tool for CDS test double framework.

Figure 1:
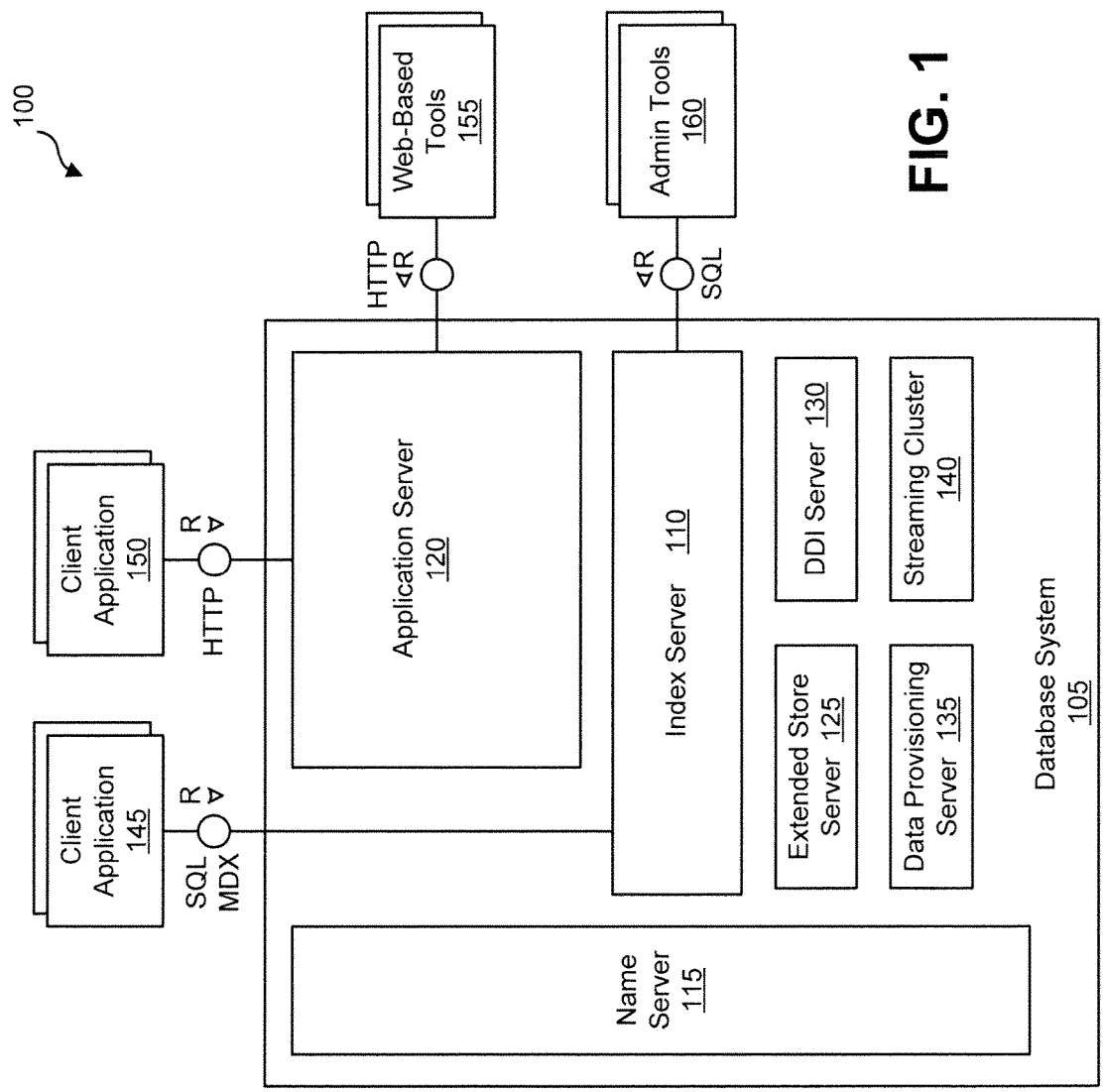
FIG. 1 is a system diagram illustrating an example database system for use in connection with the current subject matter.

FIG. 1 is a diagram 100 illustrating a database system 105 that can be used to implement aspects of the current subject matter. The database system 105 can, for example, be an in-memory database in which all relevant data is kept in main memory so that read operations can be executed without disk I/O and in which disk storage is required to make any changes durables. The database system 105 can include a plurality of servers including, for example, one or more of an index server 110, a name server 115, and/or an application server 120. The database system 105 can also include one or more of an extended store server 125, a database deployment infrastructure (DDI) server 130, a data provisioning server 135, and/or a streaming cluster 140. The database system 105 can be accessed by a plurality of remote clients 145, 150 via different protocols such as SQL/MDX (by way of the index server 110) and/or web-based protocols such as HTTP (by way of the application server 120).

The index server 110 can contain in-memory data stores and engines for processing data. The index server 110 can also be accessed by remote tools (via, for example, SQL queries), that can provide various development environment and administration tools. Additional details regarding an example implementation of the index server 110 is described and illustrated in connection with diagram 300 of FIG. 3.

The name server 115 can own information about the topology of the database system 105. In a distributed database system, the name server 115 can know where various components are running and which data is located on which server. In a database system 105 with multiple database containers, the name server 115 can have information about existing database containers and it can also host the system database. For example, the name server 115 can manage the information about existing tenant databases. Unlike a name server 115 in a single-container system, the name server 115 in a database system 105 having multiple database containers does not store topology information such as the location of tables in a distributed database. In a multi-container database system 105 such database-level topology information can be stored as part of the catalogs of the tenant databases.

The application server 120 can enable native web applications used by one or more remote clients 150 accessing the database system 105 via a web protocol such as HTTP. The application server 120 can allow developers to write and run various database applications without the need to run an additional application server. The application server 120 can also be used to run web-based tools 155 for administration, life-cycle management and development. Other administration and development tools 160 can directly access the index server 110 for, example, via SQL and other protocols.

The extended store server 125 can be part of a dynamic tiering option that can include a high-performance disk-based column store for very big data up to the petabyte range and beyond. Less frequently accessed data (for which is it non-optimal to maintain in main memory of the index server 110) can be put into the extended store server 125. The dynamic tiering of the extended store server 125 allows for hosting of very large databases with a reduced cost of ownership as compared to conventional arrangements.

The DDI server 130 can be a separate server process that is part of a database deployment infrastructure (DDI). The DDI can be a layer of the database system 105 that simplifies the deployment of database objects using declarative design time artifacts. DDI can ensure a consistent deployment, for example by guaranteeing that multiple objects are deployed in the right sequence based on dependencies, and by implementing a transactional all-or-nothing deployment.

The data provisioning server 135 can provide enterprise information management and enable capabilities such as data provisioning in real time and batch mode, real-time data transformations, data quality functions, adapters for various types of remote sources, and an adapter SDK for developing additional adapters.

The streaming cluster 140 allows for various types of data streams (i.e., data feeds, etc.) to be utilized by the database system 105. The streaming cluster 140 allows for both consumption of data streams and for complex event processing.

Figure 2:
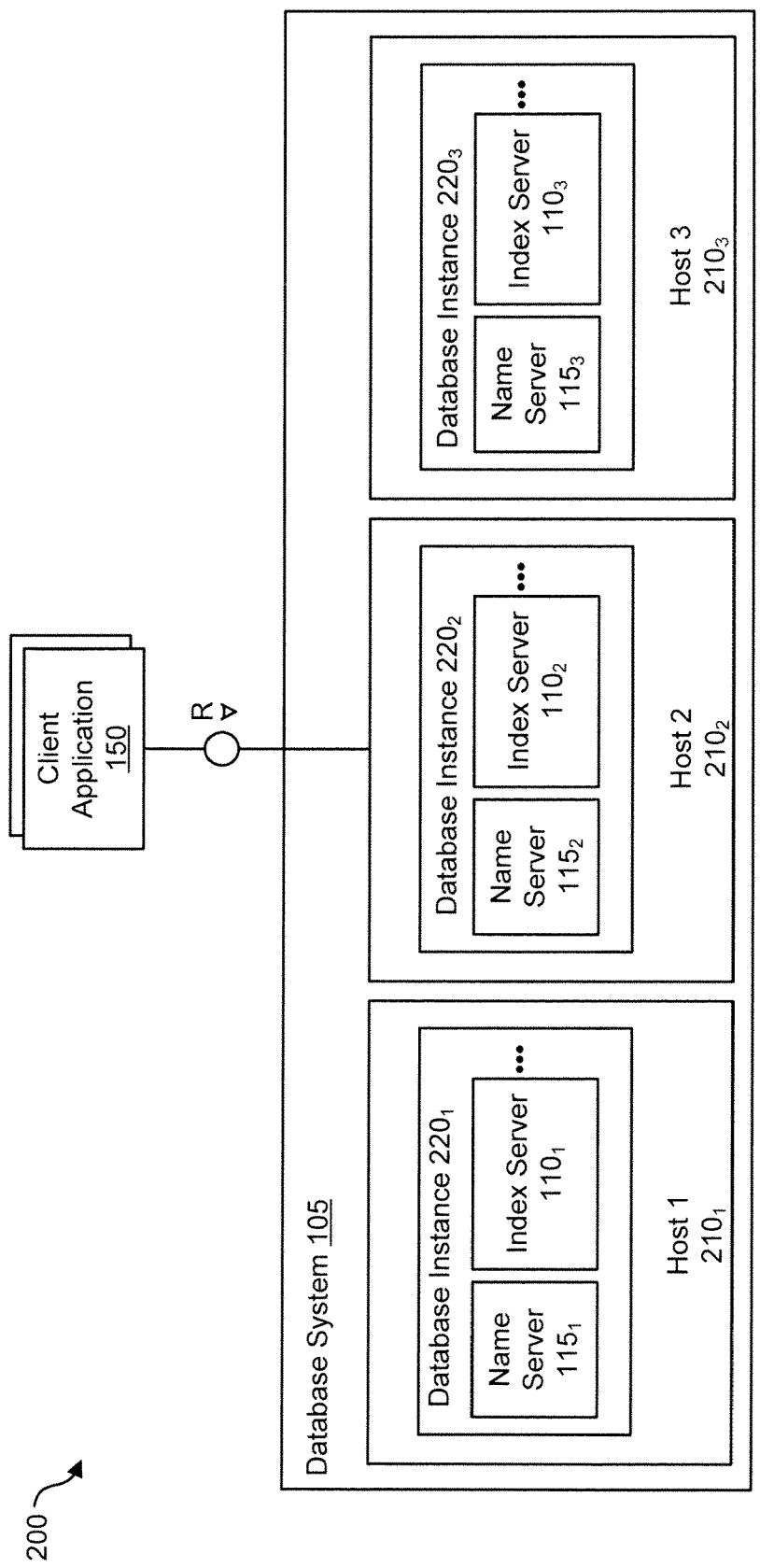
FIG. 2 is a system diagram illustrating a distributed database system having a plurality of database instances.

FIG. 2 is a diagram 200 illustrating a variation of the database system 105 that can support distribution of server components across multiple hosts for scalability and/or availability purposes. This database system 105 can, for example, be identified by a single system ID (SID) and it is perceived as one unit from the perspective of an administrator, who can install, update, start up, shut down, or backup the system as a whole. The different components of the database system 105 can share the same metadata, and requests from client applications 230 can be transparently dispatched to different servers $110_{1-3}$, $120_{1-3}$, in the system, if required.

As is illustrated in FIG. 2, the distributed database system 105 can be installed on more than one host $210_{1-3}$. Each host $210_{1-3}$ is a machine that can comprise at least one data processor (e.g., a CPU, etc.), memory, storage, a network interface, and an operation system and which executes part of the database system 105. Each host $210_{1-3}$ can execute a database instance $220_{1-3}$ which comprises the set of components of the distributed database system 105 that are installed on one host $210_{1-3}$. FIG. 2 shows a distributed system with three hosts, which each run a name server $110_{1-3}$, index server $120_{1-3}$, and so on (other components are omitted to simplify the illustration).

Figure 3:
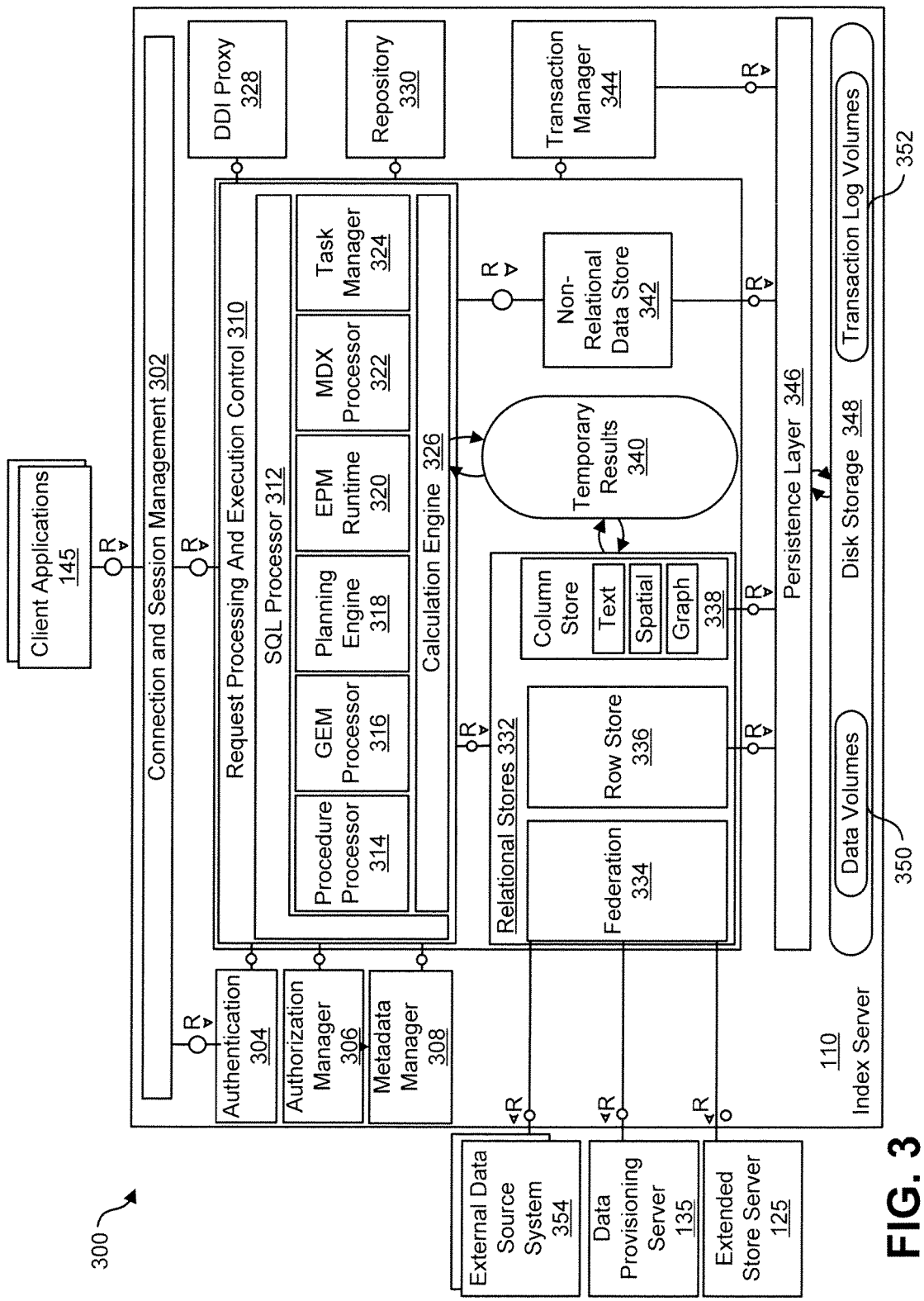
FIG. 3 is a system diagram of an index server forming part of the database system of FIG. 1.

FIG. 3 is a diagram 300 illustrating an architecture for the index server 110 (which can, as indicated above, be one of many instances). A connection and session management component 302 can create and manage sessions and connections for the client applications 145. For each session, a set of parameters can be maintained such as, for example, auto commit settings or the current transaction isolation level.

Requests from the client applications 145 can be processed and executed by way of a request processing and execution control component 310. The database system 105 offers rich programming capabilities for running application-specific calculations inside the database system. In addition to SQL, MDX, and WIPE, the database system 105 can provide different programming languages for different use cases. SQLScript can be used to write database procedures and user defined functions that can be used in SQL statements. The L language is an imperative language, which can be used to implement operator logic that can be called by SQLScript procedures and for writing user-defined functions.

Once a session is established, client applications 145 typically use SQL statements to communicate with the index server 110 which can be handled by a SQL processor 312 within the request processing and execution control component 310. Analytical applications can use the multidimensional query language MDX (MultiDimensional eXpressions) via an MDX processor 322. For graph data, applications can use GEM (Graph Query and Manipulation) via a GEM processor 316, a graph query and manipulation language. SQL statements and MDX queries can be sent over the same connection with the client application 145 using the same network communication protocol. GEM statements can be sent using a built-in SQL system procedure.

The index server 110 can include an authentication component 304 that can be invoked with a new connection with a client application 145 is established. Users can be authenticated either by the database system 105 itself (login with user and password) or authentication can be delegated to an external authentication provider. An authorization manager 306 can be invoked by other components of the database system 145 to check whether the user has the required privileges to execute the requested operations.

Each statement can processed in the context of a transaction. New sessions can be implicitly assigned to a new transaction. The index server 110 can include a transaction manager 344 that coordinates transactions, controls transactional isolation, and keeps track of running and closed transactions. When a transaction is committed or rolled back, the transaction manager 344 can inform the involved engines about this event so they can execute necessary actions. The transaction manager 344 can provide various types of concurrency control and it can cooperate with a persistence layer 346 to achieve atomic and durable transactions.

Incoming SQL requests from the client applications 145 can be received by the SQL processor 312. Data manipulation statements can be executed by the SQL processor 312 itself. Other types of requests can be delegated to the respective components. Data definition statements can be dispatched to a metadata manager 306, transaction control statements can be forwarded to the transaction manager 344, planning commands can be routed to a planning engine 318, and task related commands can forwarded to a task manager 324 (which can be part of a larger task framework) Incoming MDX requests can be delegated to the MDX processor 322. Procedure calls can be forwarded to the procedure processor 314, which further dispatches the calls, for example to a calculation engine 326, the GEM processor 316, a repository 300, or a DDI proxy 328.

The index server 110 can also include a planning engine 318 that allows planning applications, for instance for financial planning, to execute basic planning operations in the database layer. One such basic operation is to create a new version of a data set as a copy of an existing one while applying filters and transformations. For example, planning data for a new year can be created as a copy of the data from the previous year. Another example for a planning operation is the disaggregation operation that distributes target values from higher to lower aggregation levels based on a distribution function.

The SQL processor 312 can include an enterprise performance management (EPM) runtime component 320 that can form part of a larger platform providing an infrastructure for developing and running enterprise performance management applications on the database system 105. While the planning engine 318 can provide basic planning operations, the EPM platform provides a foundation for complete planning applications, based on by application-specific planning models managed in the database system 105.

The calculation engine 326 can provide a common infrastructure that implements various features such as SQLScript, MDX, GEM, tasks, and planning operations. The SQLScript processor 312, the MDX processor 322, the planning engine 318, the task manager 324, and the GEM processor 316 can translate the different programming languages, query languages, and models into a common representation that is optimized and executed by the calculation engine 326. The calculation engine 326 can implement those features using temporary results 340 which can be based, in part, on data within the relational stores 332.

Metadata can be accessed via the metadata manager component 308. Metadata, in this context, can comprise a variety of objects, such as definitions of relational tables, columns, views, indexes and procedures. Metadata of all these types can be stored in one common database catalog for all stores. The database catalog can be stored in tables in a row store 336 forming part of a group of relational stores 332. Other aspects of the database system 105 including, for example, support and multi-version concurrency control can also be used for metadata management. In distributed systems, central metadata is shared across servers and the metadata manager 308 can coordinate or otherwise manage such sharing.

The relational stores 332 form the different data management components of the index server 110 and these relational stores can, for example, store data in main memory. The row store 336, a column store 338, and a federation component 334 are all relational data stores which can provide access to data organized in relational tables. The column store 338 can store relational tables column-wise (i.e., in a column-oriented fashion, etc.). The column store 338 can also comprise text search and analysis capabilities, support for spatial data, and operators and storage for graph-structured data. With regard to graph-structured data, from an application viewpoint, the column store 338 could be viewed as a non-relational and schema-flexible in-memory data store for graph-structured data. However, technically such a graph store is not a separate physical data store. Instead it is built using the column store 338, which can have a dedicated graph API.

The row store 336 can store relational tables row-wise. When a table is created, the creator can specify whether it should be row or column-based. Tables can be migrated between the two storage formats. While certain SQL extensions are only available for one kind of table (such as the "merge" command for column tables), standard SQL can be used on all tables. The index server 110 also provides functionality to combine both kinds of tables in one statement (join, sub query, union).

The federation component 334 can be viewed as a virtual relational data store. The federation component 334 can provide access to remote data in external data source system(s) 354 through virtual tables, which can be used in SQL queries in a fashion similar to normal tables.

The database system 105 can include an integration of a non-relational data store 342 into the index server 110. For example, the non-relational data store 342 can have data represented as networks of C++ objects, which can be persisted to disk. The non-relational data store 342 can be used, for example, for optimization and planning tasks that operate on large networks of data objects, for example in supply chain management. Unlike the row store 336 and the column store 338, the non-relational data store 342 does not use relational tables; rather, objects can be directly stored in containers provided by the persistence layer 346. Fixed size entry containers can be used to store objects of one class. Persisted objects can be loaded via their persisted object IDs, which can also be used to persist references between objects. In addition, access via in-memory indexes is supported. In that case, the objects need to contain search keys. The in-memory search index is created on first access. The non-relational data store 342 can be integrated with the transaction manager 344 to extends transaction management with sub-transactions, and to also provide a different locking protocol and implementation of multi version concurrency control.

An extended store is another relational store that can be used or otherwise form part of the database system 105. The extended store can, for example, be a disk-based column store optimized for managing very big tables, which ones do not want to keep in memory (as with the relational stores 332). The extended store can run in an extended store server 125 separate from the index server 110. The index server 110 can use the federation component 334 to send SQL statements to the extended store server 125.

The persistence layer 346 is responsible for durability and atomicity of transactions. The persistence layer 346 can ensure that the database system 105 is restored to the most recent committed state after a restart and that transactions are either completely executed or completely undone. To achieve this goal in an efficient way, the persistence layer 346 can use a combination of write-ahead logs, shadow paging and savepoints. The persistence layer 346 can provide interfaces for writing and reading persisted data and it can also contain a logger component that manages a transaction log. Transaction log entries can be written explicitly by using a log interface or implicitly when using the virtual file abstraction.

The persistence layer 236 stores data in persistent disk storage 348 which, in turn, can include data volumes 350 and/or transaction log volumes 352 that can be organized in pages. Different page sizes can be supported, for example, between 4 k and 16 M. Data can be loaded from the disk storage 348 and stored to disk page wise. For read and write access, pages can be loaded into a page buffer in memory. The page buffer need not have a minimum or maximum size, rather, all free memory not used for other things can be used for the page buffer. If the memory is needed elsewhere, least recently used pages can be removed from the cache. If a modified page is chosen to be removed, the page first needs to be persisted to disk storage 348. While the pages and the page buffer are managed by the persistence layer 346, the in-memory stores (i.e., the relational stores 332) can access data within loaded pages.

Figure 4:
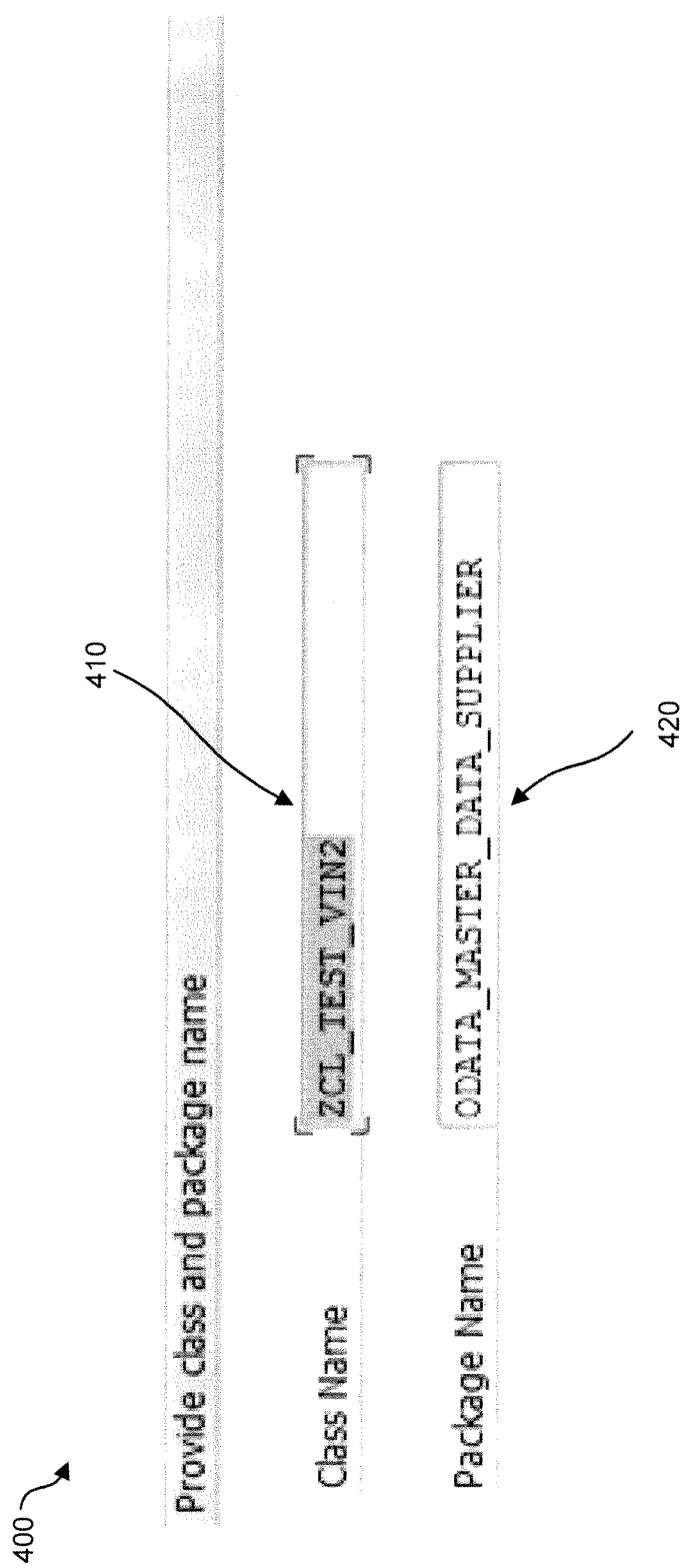
FIG. 4 is a view illustrating an example of a starting screen for entering class name and package name as inputs.

FIG. 4 is a view of a starting screen 400 for entering class name and package name as inputs. It may have a cell 410 for entering class name as an input. It also may have a cell 420 for entering package name as an input. Class name 410 may refer to the name of class in which the test classes will be generated by automation tool. Package name 420 may refer to the name of a package that encompasses CDS views for which test class is to be generated.

Figure 5:
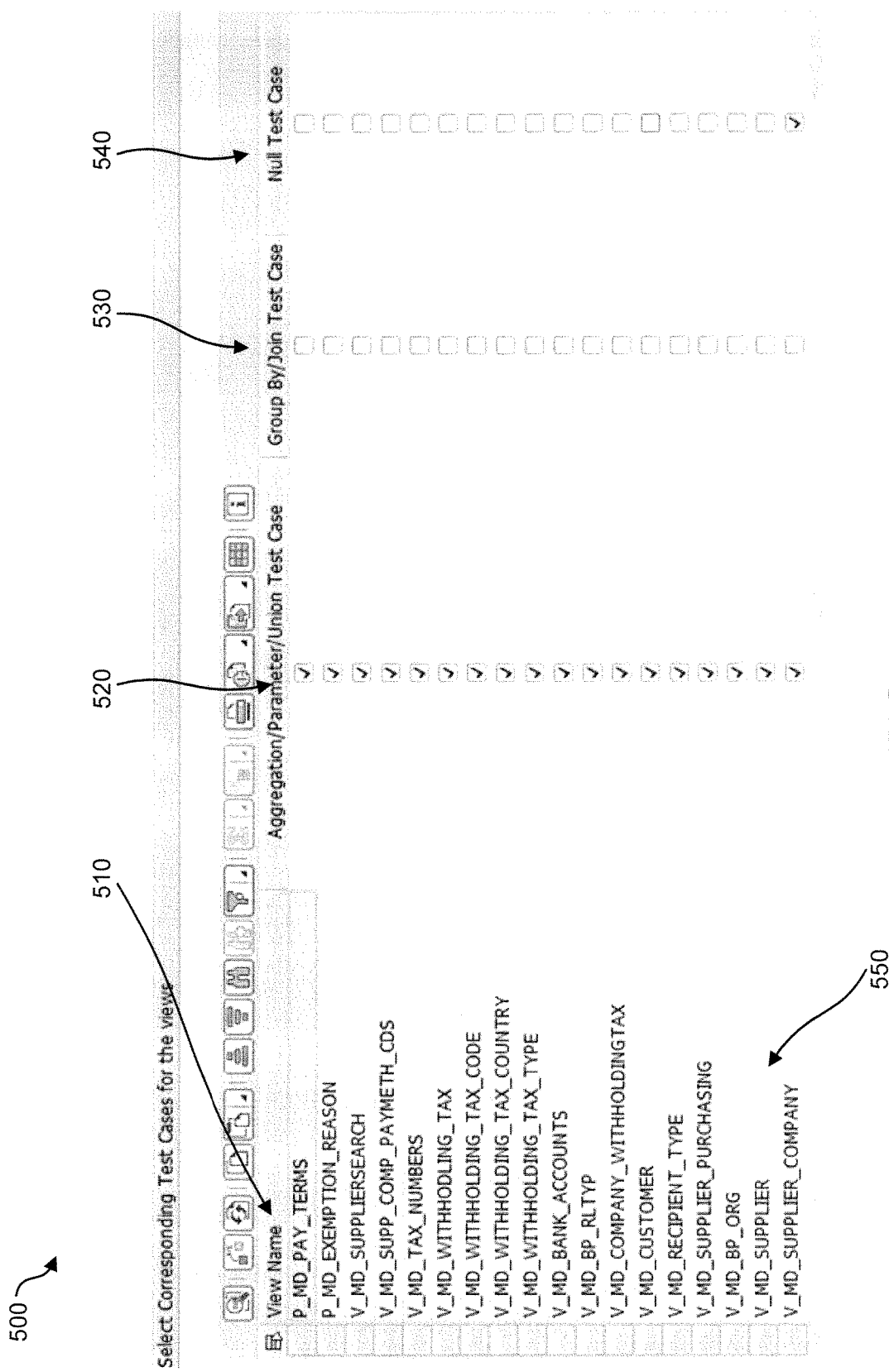
FIG. 5 is a view illustrating an example of a selection screen for selecting views for which test classes need to be generated.

FIG. 5 is a view of a selection screen 500 for selecting views for which test classes need to be generated. It may contain several columns. There may be column 510 with a listing of view names, column 520 to select whether an aggregation/parameter/union test case should be generated for a corresponding view, column 530 to select whether a group by/join test case should be generated for a corresponding view, and/or column 540 to select whether a null test case should be generated for a corresponding view. Other columns may also be included on the selection screen 500. Column 510 may be populated with view names 550.

Figure 6:
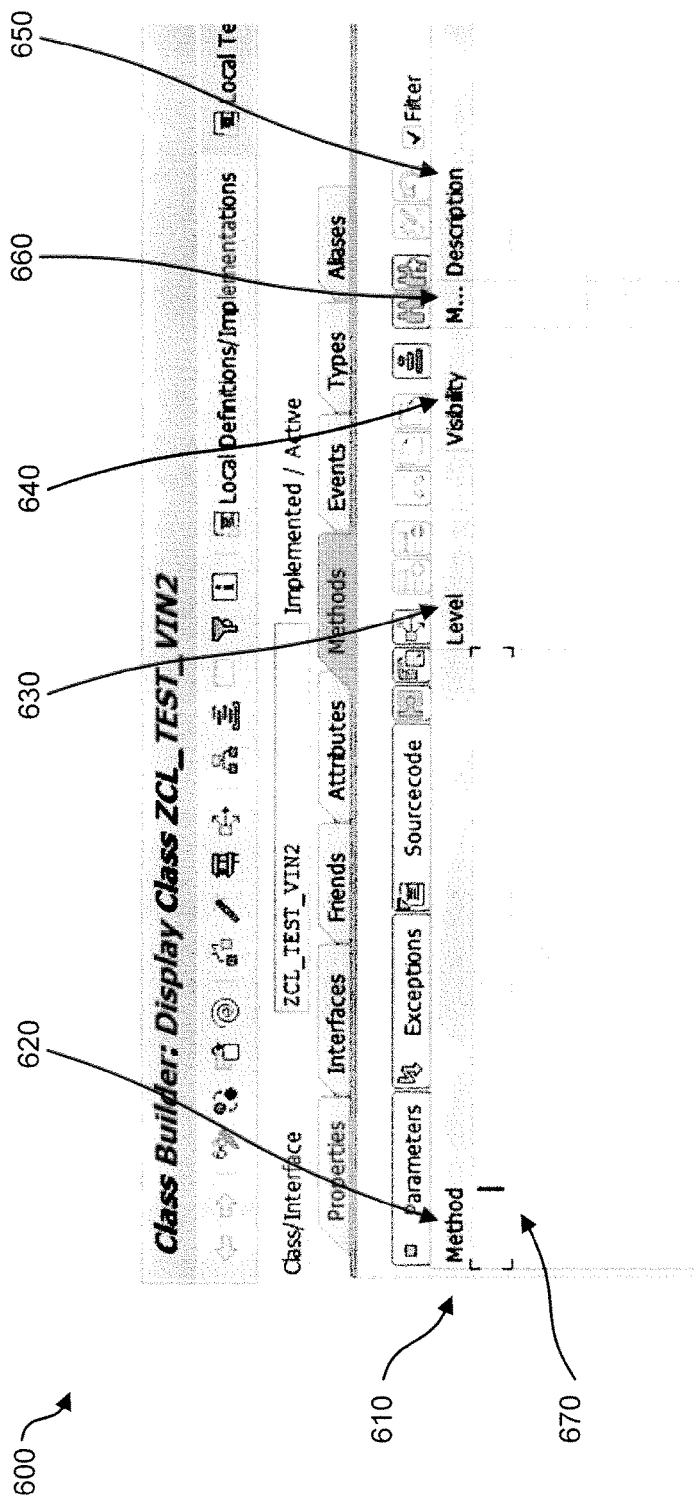
FIG. 6 is a view illustrating an example of a class screen for building a display class.

FIG. 6 is a view of a class screen 600 for building a display class. Class screen 600 may contain a title line 610 which may list column headings for columns of the class screen. Column of the class screen may include column 620 for a method column 630 for a level, column 640 for a visibility, column 650 for a description, and other columns 660. A user may enter information onto a class screen in cells 670.

Figure 7:
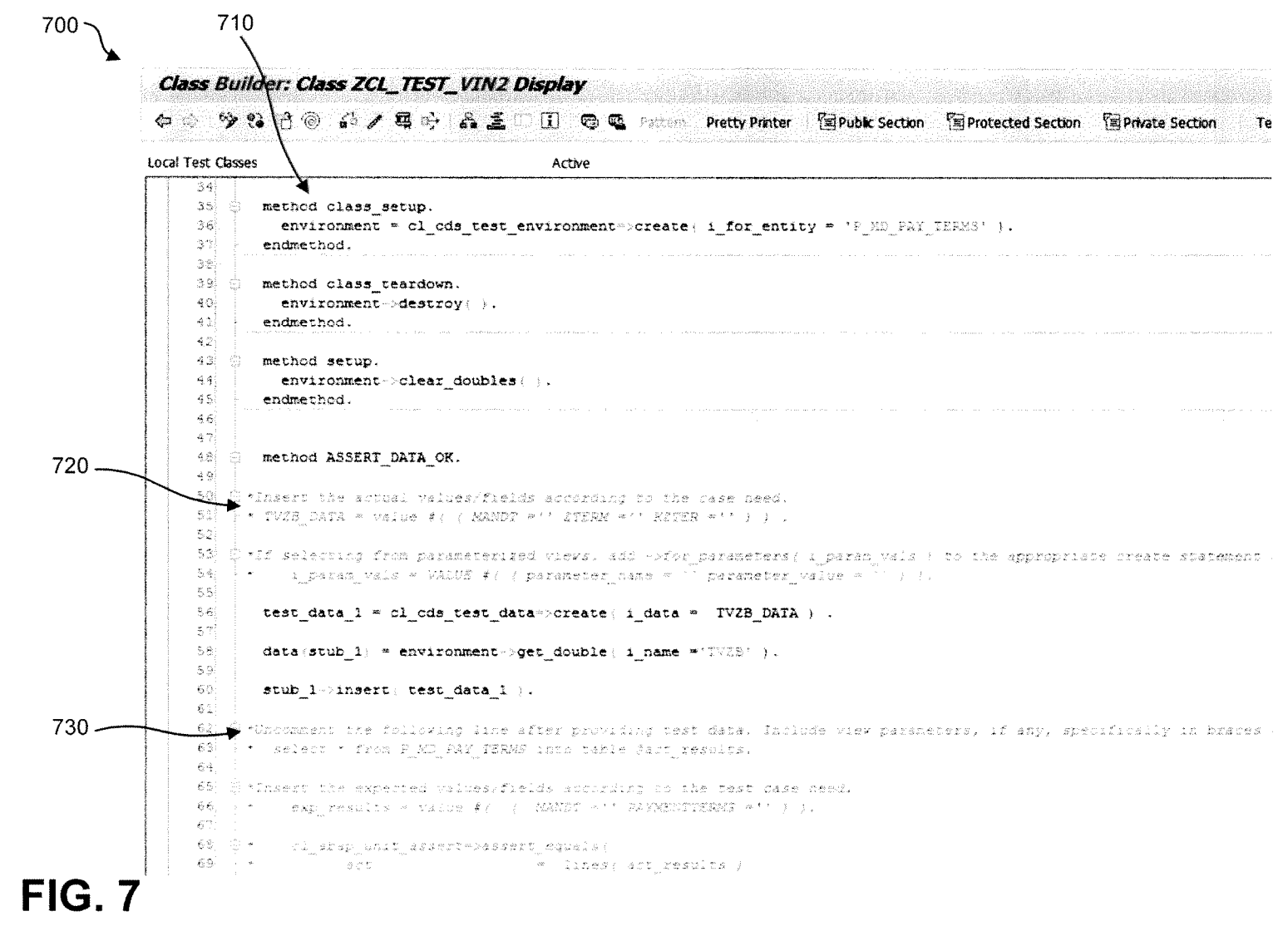

FIG. 7 is a view 700 of a portion of a class builder code for automated generation of test classes. Representative code 710 is shown, including commented out lines. Commented out line 720 is an example of a line that would be uncommented during execution and provide actual values/fields according to the case need. Commented out line 730 is an example of a line that would be uncommented during execution and provide view parameters. Other commented out lines may be included in the code. Some or all of the commented out lines may be uncommented during execution of the code.

Figure 8:
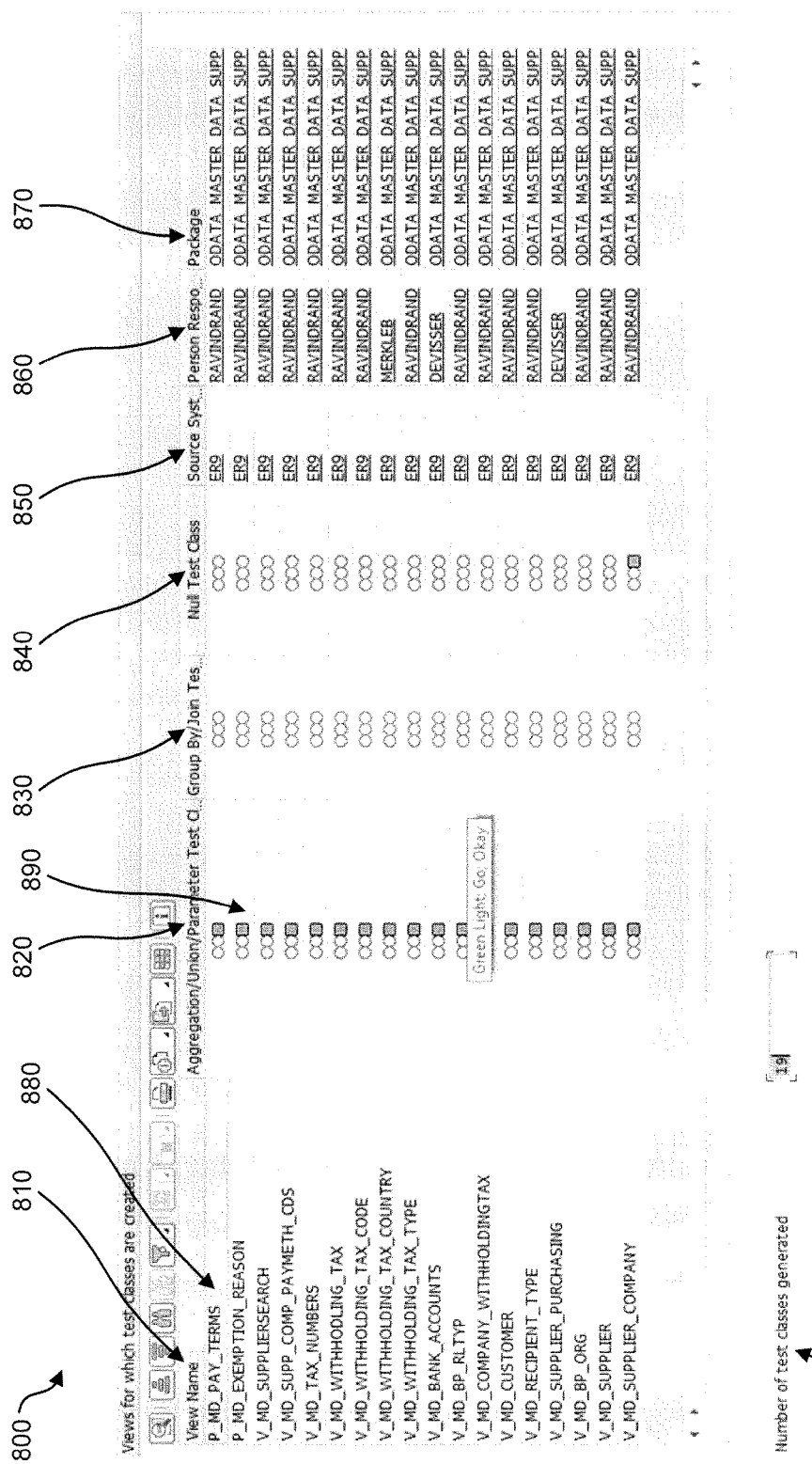
FIG. 8 is a view illustrating an example of a result screen that visualizes generated test classes.

FIG. 8 is a view of a result screen 800 that visualizes generated test classes. Result screen 800 may contain several columns, including some or all of the following columns: view name 810, aggregation/union/parameter test class 820, group by/join test class 830, null test class 840, source system 850, responsible person 860, and package name 870. Result screen 800 may also contain other columns. Result screen 800 may also contain a report 895 on the number of generated test cases. A column 810 of view names may be populated with a list of view names 880. A column 820 of aggregation/union/parameter test class may show, though highlighting 890 or other indication, whether aggregation/union/parameter test class was generated for a corresponding view.

Figure 9:
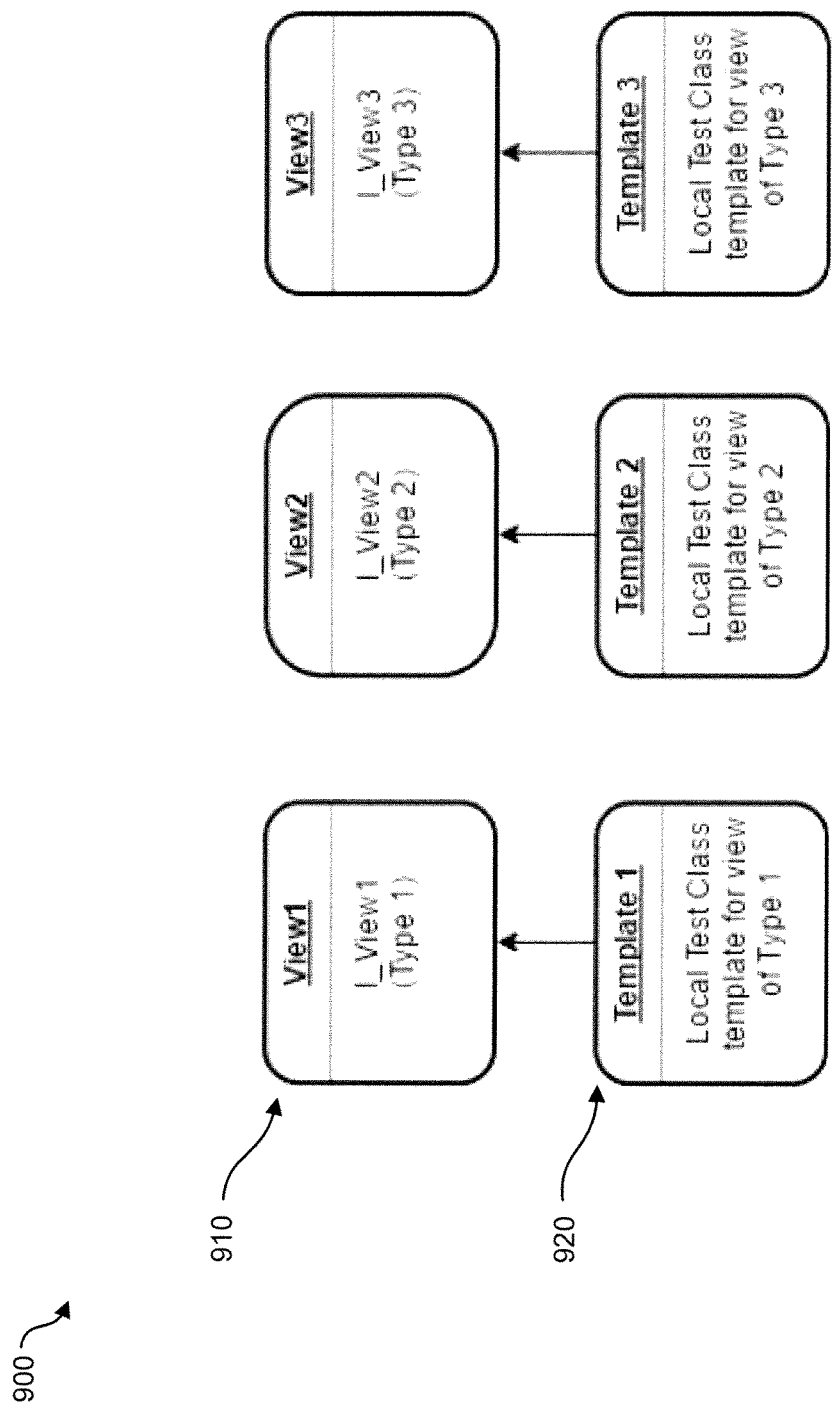
FIG. 9 is a diagram illustrating a method assigning templates to views for test class generation.

FIG. 9 is a diagram 900 illustrating a method of assigning templates 920 to views 910 for test class generation. There are different types of CDS views and each may have different pattern for its assertion, therefore for each type there may be a different template which will be used for the local test class generation. Each view 910 may belong to one of the view types. View type may be one of the following: simple CDS interface view, CDS view with aggregations, CDS view with calculations, CDS view with data control language (DCL), CDS view with group by and join, CDS view with parameters, CDS view with unions, CDS view with table functions, and CDS view with nulls. Each template 920 may be a local test class template of a type corresponding to a view type.

Figure 10:
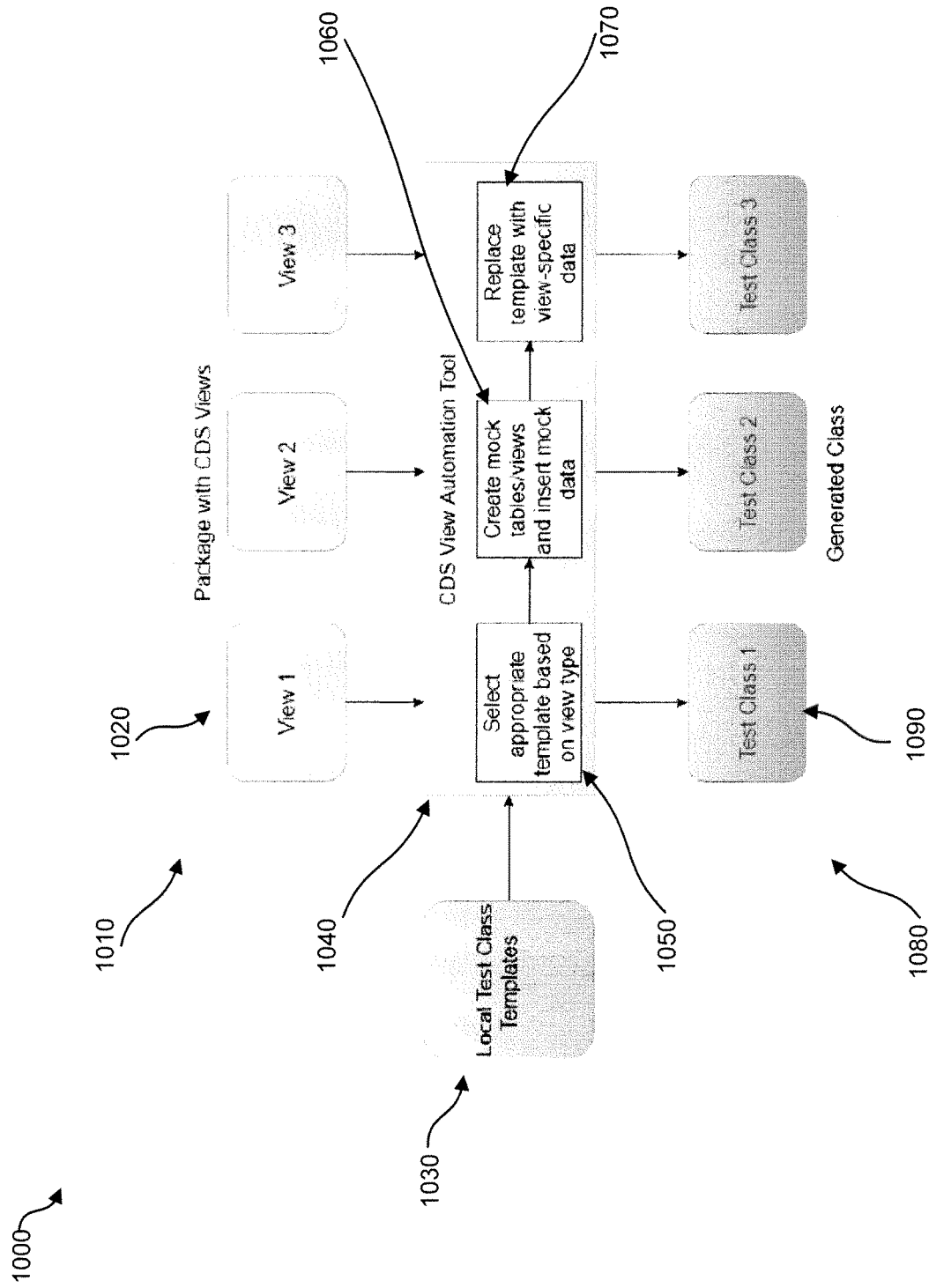
FIG. 10 is a diagram illustrating a method of core data services test double framework using a core data services view automation tool.

FIG. 10 is a diagram 1000 illustrating a method of CDS test double framework using a CDS view automation tool 1040. A package 1010 with one or more CDS views 1020 may serve as an input to the CDS view automation tool 1040. Another input to the CDS view automation tool 1040 may be local test class templates 1030. CDS view automation tool 1040 may select (1050) appropriate template based on CDS view type, create (1060) mock tables/views and inserts mock data, and replace (1070) template with view specific data. An output of the CDS view automation tool 1040 may be a generated class 1080, which may include one or more test classes 1090.

The local test class execution may be based on CDS Test Double Framework. Framework may create a mock table/view for all the underlying tables/views of the CDS view. Mock data may then be passed by a user to all those mock views/tables. Then the test double framework may execute the SQL select query on this data to give the actual result for the CDS view. The actual result may be asserted and compared to the expected result for the same CDS view.

CDS view automation tool 1040 may take the package name and a class name as input. The tool may have different kinds of test class templates available with it, using which the local test classes will be generated. The tool may loop through the package name provided, find the CDS views present in the package, determine the type of each CDS view and then select the corresponding template for that type of CDS view. Then it may replace the placeholders in the template with the values obtained from the CDS view to generate a test class for the CDS view. The tool may generate test classes for all the CDS views available in a particular package.

Execution of the tool may include some or all of the following steps: go to transaction se38, type the name of the report, execute the report, enter package name and a class name as input, click on generate test classes button, process and generate test classes for all the CDS views available in the given package name.

FIG. 11 is a flow chart illustrating an example of the current subject matter. The example represents a computer-implemented method 1100 for evaluating integrity of data models. In step 1110, a package comprising a semantic and reusable data model expressed in data definition language is selected. In step 1120, a class to create a plurality of local test classes is selected. In step 1130, a plurality of local test class templates for the package are generated based on a class name and a package name. In step 1140, an integrity of the data model is determined by comparing an actual result for the data model and an expected result for the data model.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system can include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "computer-readable medium" refers to any computer program product, apparatus and/or device, such as for example magnetic discs, optical disks, memory, and Programmable Logic Devices (PLDs), used to provide machine instructions and/or data to a programmable processor, including a computer-readable medium that receives machine instructions as a computer-readable signal. The term "computer-readable signal" refers to any signal used to provide machine instructions and/or data to a programmable processor. The computer-readable medium can store such machine instructions non-transitorily, such as for example as would a non-transient solid-state memory or a magnetic hard drive or any equivalent storage medium. The computer-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device (e.g., a CRT (cathode ray tube) or LCD (liquid crystal display) monitor) for displaying information to the user and a keyboard and a pointing device (e.g., a mouse or a trackball) and/or a touchscreen by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer-implemented method for evaluating integrity of data models, comprising:
   selecting a package comprising a semantic and reusable data model expressed in data definition language;
   selecting a class to create a plurality of local test classes;
   generating, based on a class name and a package name, a plurality of local test class templates for the package; and
   determining an integrity of the data model by comparing an actual result for the data model and an expected result for the data model.

2. The method of claim 1, wherein the data model comprises a CDS view.

3. The method of claim 2, wherein the generating comprises:
   selecting an appropriate local test class template based on a CDS view type;
   creating mock tables/views;
   inserting mock data; and
   replacing the selected local test class template with a CDS view-specific data.

4. The method of claim 3, wherein the determining step comprises a CDS test double framework.

5. The method of claim 3, where the determining step comprises:
   executing a SQL select query on the mock data to produce an actual result for the data model;
   providing an expected result for the data model; and
   comparing the actual result and the expected result.

6. The method of claim 5, wherein each of the plurality of local test class templates corresponds to a different one of a plurality of CDS view types.

7. The method of claim 6, wherein the plurality of CDS view types comprises an interface view, view with aggregations, a view with calculations, a view with data control language, a view with group by and join, a view with parameters, a view with unions, a view with table functions, and a view with nulls.

8. The method of claim 1, further comprising, prior to determining, building a mock database and populating the mock database with a mock data.

9. A method of test class generation for evaluating integrity of a database view, comprising:
   selecting a package comprising at least one database view, each of the at least one database view having a different database view type;
   providing a class name and a package name;
   selecting appropriate local test class templates based on database view types of database views in the package;
   creating mock tables and mock database views;
   inserting mock data into the mock tables and mock database views;
   replacing a local test class with a view-specific data; and
   generating test classes.

10. The method of claim 9, wherein each of the at least one database views comprises a CDS view.

11. The method of claim 10, further comprising determining an integrity of the CDS view.

12. The method of claim 11, wherein the determining comprises a CDS test double framework.

13. The method of claim 11, where the determining step comprises:
   executing a SQL select query on the mock data to produce an actual result for the data model;
   providing an expected result for the data model; and
   comparing the actual result and the expected result.

14. The method of claim 11, wherein each of the selected local test class templates corresponds to a different one of a plurality of CDS view types.

15. The method of claim 14, wherein the plurality of CDS view types comprises an interface view, view with aggregations, a view with calculations, a view with data control language, a view with group by and join, a view with parameters, a view with unions, a view with table functions, and a view with nulls.

16. The method of claim 11, further comprising, prior to determining, building a mock database and populating the mock database with a mock data.

17. A non-transitory computer readable medium containing program instructions, wherein execution of the program instructions by one or more processors of a computer system causes one or more processors to perform operations comprising:
   selecting a package comprising a CDS view;
   selecting a class to create a plurality of local test classes;
   generating, based on a class name and a package name, a plurality of local test class templates for the package; and
   determining an integrity of the CDS view by comparing an actual result for the CDS view and an expected result for the CDS view.

18. The non-transitory computer readable medium of claim 17, wherein the generating comprises:
   selecting an appropriate local test class template based on a CDS view type;
   creating mock tables/views;
   inserting mock data; and
   replacing the selected local test class template with a CDS view-specific data.

19. The non-transitory computer readable medium of claim 17, where the determining comprises:
   executing a SQL select query on the mock data to produce an actual result for the data model;
   providing an expected result for the data model; and
   comparing the actual result and the expected result.

20. The method of claim 17, wherein each of the plurality of local test class templates corresponds to a different one of a plurality of CDS view types, the plurality of CDS view types comprising an interface view, view with aggregations, a view with calculations, a view with data control language, a view with group by and join, a view with parameters, a view with unions, a view with table functions, and a view with nulls.

* * * * *